3,830,788
POLYMERISATION PROCESS

Brian Ernest Job, and Till Medinger, Runcorn, England, assignors to Imperial Chemical Industries Limited, London, England
No Drawing. Continuation of abandoned application Ser. No. 733,296, May 31, 1968. This application Sept. 11, 1972, Ser. No. 287,705
Claims priority, application Great Britain, June 9, 1967, 26,796/67; July 13, 1967, 32,319/67; Nov. 1, 1967, 49,729/67

Int. Cl. C08f 1/30

U.S. Cl. 260—94.9 C           10 Claims

ABSTRACT OF THE DISCLOSURE

A process for the polymerization of ethylene which comprises contacting the ethylene monomer with a π-allylic compound of a transition metal of Group IVA of the Periodic Table, as initiator, in the presence of an activator selected from the group consisting of halogenated paraffins and olefins and free halogens at a temperature from 0° to 300° C., the ratio of activator to initiator being not greater than 4:1, expressed as the ratio of gram atoms of halogen present in the activator to moles of π-allylic compound initiator.

---

This is a continuation of S.N. 733,296 filed May 31, 1968 now abandoned.

This invention relates to the polymerisation of ethylene and, especially, to the polymerisation of ethylene using π-allylic transition metal compounds as initiators.

It has been proposed to polymerise olefinically unsaturated monomers using π-allylic transition metal compounds as initiators. For example, ethylene has been polymerised both at high (1000 atmospheres and above) and low (1 to 50 atmospheres) pressures to give solid polymers, generally of the type commonly referred to as "high-density" polyethylene.

It has also been proposed to add halogen-containing organic compounds to such initiators to improve their activity as initiators for the polymerisation of ethylenically unsaturated monomers, for example, methyl methacrylate. However, these proposals have envisaged the addition of a virtually uncontrolled amount of halogen-containing compound, the concentration of halogen-containing compound commonly being many times that of the initiator.

We have now found that the activity of certain of these π-allylic compounds as initiators for the polymerisation of ethylene may be considerably enhanced by the incorporation of a controlled amount of a non-metallic halogen-containing compound in the reaction mixture.

According to the present invention, a process for the polymerisation of ethylene comprises contacting ethylene with an initiator comprising a π-allylic compound of a transition metal of Group IVA of the Periodic Table in the presence of an activator comprising a non-metallic halogen-containing compound, the ratio of activator to initiator being such that the ethylene polymerisation activity of the initiator is enhanced. Preferably the ratio of activator to initiator is not greater than 4:1, expressed as the ratio of gram atoms of halogen present in the activator to moles of π-allylic compound initiator.

The degree of initiator enhancement produced by our process is closely dependent on the ratio of activator to initiator, so that the amount of activator added must be carefully controlled. This is especially important with regard to avoiding too great an excess of activator since this will not only diminish the amount of enhancement obtained but will tend to inhibit the activity of the initiator completely if a sufficient excess of activator is added, for example, more than a fourfold excess.

However, the actual ratio of activator to initiator which is effective in enhancing the activity of the initiator and the actual ratio at which the inhibiting effect occurs, will depend on the nature of the activator used, the conditions under which the polymerisation is performed (e.g. temperature and pressure) and the nature of the initiator. However, the appropriate ratio is readily determined by the simple expedient of varying the activator/initiator ratio in a series of otherwise identical ethylene polymerisations and determining the amount of polymer produced. From these determinations the polymerisation activity of the appropriate activator/initiator combination may be calculated.

Generally, the polymerisation activity of a given activator/initiator combination will pass through a maximum as the proportion of activator is increased, so that an optimum activator/initiator ratio may be determined. However, this optimum ratio and the range of ratios over which enhancement of activity is obtained may also vary with differing polymerisation conditions. Although it is usually desirable to operate using the activator/initiator ratio giving optimum activity for the combination being used, it is possible that under certain circumstances other advantages might appear at useful but non-optimum ratios, so as to make operation in this way desirable.

Although the optimum and maximum effective ratios for any given activator/initiator combination may only be determined by experiment, it has been found, especially in the case of simple halogen-containing compounds, that the effective ratio is rarely greater than 4:1 expressed as the ratio of gram atoms of halogen present in the activator compound to moles of π-allylic compound initiator. In many cases the maximum effective ratio is less than 2:1.

For example, in the system allyl bromide/tetrakis(π-allyl)zirconium, at 40 kg./cm.$^2$ total gas pressure, the optimum ratio was about 1:1 and the previously mentioned inhibiting effect was observed at a ratio of 2:1. When a similar activator/initiator combination was used batchwise at a total gas pressure of about 2000 kg./cm.$^2$, the optimum ratio was about 1.3:1 and the inhibiting effect was observed at a ratio of 4.5:1.

Preferably the activator is chosen so that it is soluble in the reaction medium and/or solvent in which the initiator is introduced into the polymerisation vessel, to facilitate homogeneous reaction. Suitable halogen-containing compounds are halogenated paraffins or olefins, for example, allyl chloride, allyl bromide, 2-methallyl chloride, carbontetrachloride, 1,2 dibromopropane, n-propyl chloride, isopropyl chloride, n-propyl bromide, isopropyl bromide, allyl fluoride, allyl iodide, 1-chloro-2-methallyl-chloride, 2,3-dichloropropene, 1-chloropropene, t-butyl-chloride, t-butylbromide. However, other halogenated organic compounds e.g. chlorobenzene, may be used.

It is also possible to use an elemental halogen or a hydrogen halide as the activator. For example, when tetrakis(π-allyl)zirconium was added to a polymerisation vessel charged with ethylene and iodine at 160° C., the initiator was activated. Without prejudice to the invention, it is thought possible that di-iodoethane was formed as a transient species and that this may have caused the activation. Generally speaking the use of elemental halogens or halogen halides is more inconvenient than the use of halogen-containing organic compounds many of which may be readily obtained as innocuous liquids.

Activators containing any halogen may be used in our process. The precise mechanism of activation is not fully understood, but it appears likely that the lability of the halogen atom involved is at least a contributory factor. For example, it has been found that allyl bromide and allyl chloride are more effective than chlorobbenzene or allyl fluoride, the halogen atoms in the first two compounds being more labile than those in the last two compounds.

By the term "π-allylic compound of a transitional metal," we mean an organo-metallic compound of a transition metal, as hereinbefore defined, containing at least one allylic group of the general formula:

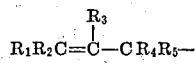

bonded to the metal.

In the formula I, $R_1$ to $R_5$, which may be the same or different, represent hydrogen atoms or monovalent substituents, such as hydrocarbyl group, for example, alkyl, aryl, aralkyl, alkaryl or alkenyl (where alkyl includes cycloalkyl) or a substituted derivative thereof, or $-NO_2$, $-CN$, $-SH$ or OH groups. Alternatively, two or more of the free valencies satisfied by $R_1-R_5$ may be linked together by a divalent organic radical, for example, a polymethylene or alkylidene group.

The Periodic Table referred to is the long Periodic Table of the Elements as shown inside the back cover of "General and Inorganic Chemistry" by Partington, published by Macmillan, 2nd Edition. The preferred metal of Group IVA is zirconium.

The organo-metallic initiators useful in our invention preferably contain only π-allylic ligands; but other ligands may also be present as desired and these may be anionic, cationic or neutral and mono- or poly-dentate in character, provided that they do not adversely affect the polymerisation characteristics of the initiator.

The required π-allylic compounds may be prepared by a number of techniques some of which are well described in published literature. They may, for example, be prepared by reacting a metal halide or complexes metal halide with an allyl Grignard reagent, usually in ether solution at low temperatures. Substituted π-allylic compounds may be prepared by using the appropriate substituted allyl Grignard. It will be appreciated that no single process is necessarily applicable to the production of the whole range of π-allylic compounds.

Precautions must be taken at all times to avoid contact with air and moisture to prevent loss of catalytic activity. Many of the π-allylic compounds useful in our invention are preferably stored at temperatures below 0° C.

It has been shown that under certain circumstances the purity of the solution of π-allylic compound used as initiator has a marked effect on its activity. This appears peculiar to the present activated systems, since there is no noticeable variation of activity with purity in the absence of halogen-containing activator. To take advantage of this effect, the π-allylic compound may be purified by any suitable technique, for example, by vacuum sublimation or by recrystallisation from a suitable solvent, such as pentane. Generally a single recrystallisation is sufficient.

The polymerisation process of our invention may be carried out at any pressure above atmospheric. The process may be carried out either batchwise or continuously, the latter being preferably performed under combined conditions of pressure and temperature such that the ethylene, polymer activator and initiator exist as a single fluid phase, as described in our earlier co-pending patent application number 709,218, now abandoned, relating to the use of π-allylic transition metal initiator at a pressure of not less than 1600 atmospheres and temperature not less than 125° C.

Such continuous polymerisation may be conducted in substantially the same way as the well known high pressure process for the polymerisation of ethylene in which free-radical producing compounds are used as initiators. In the conventional high pressure processes it is not normally necessary to carry out a purifying process to remove residual initiator from the product. Thus if organo-metallic initiators are to be used analogously, it is desirable to use an initiator of sufficiently high efficiency for its residues to be present in the product only in low concentrations which are not detrimental to the product for most normal uses. The activated π-allylic initiators of the present invention are thus of particular interest from this point of view.

In order to satisfy the above requirement the effective initiator efficiency is preferably such that the amount which must be added to the reactor is not more than 0.1% by weight of the polymer produced by the process, so that the metal residue from the initiator is present in a tolerable amount.

Compared with the products of conventional high pressure processes, the products obtained by analogous use of our activated π-allyl initiators show greater linearity than can normally be obtained at an economic rate, and are therefore stiffer and of higher density. Furthermore, our activated π-allyl initiators possess a particular advantage over the Ziegler catalysts when used in the high pressure polymerisation process in that, unlike most Ziegler catalysts, they are soluble in a number of liquids inert to the polymerisation reaction, and can thus be more easily introduced at controlled rates into the polymerisation reaction.

The activator/initiator combinations of our invention may be used in the temperature range 0–300° C.; but the choice of temperature within that range will depend upon the conditions of polymerisation and the nature of the initiator used. For example, in a continuous polymerisation process when using zirconium tetrakis(π-allyl) temperatures in the range 150–220° C. are preferred; but, as already mentioned, in such a process, the temperature is largely co-dependent on the pressure so as to ensure the desired operating conditions.

Whichever method of operation is used, the two components of the activator/initiator, combination may be added to the reaction mixture singly or together; but it is generally more convenient if they are added at the same stage in the reaction, preferably as a liquid mixture. This is readily accomplished by dissolving the two components in a single inert solvent. Suitable solvents include, for example, white spirit, hydrocarbon oils, pentane, hexane, heptane, isooctane, toluene and decahydronaphthalene. The ethylene and any solvent used must be rigorously dried and freed from deleterious impurities. The initiator solution is kept out of contact with water and air, preferably under a nitrogen blanket, before its introduction. The concentration of initiator in the solution will depend on several factors, such as the activity of the initiator, and, in the continuous process, the pumping speed used to inject the solution into the reactor, the nozzle characteristics and the solvent used. The optimum concentration may be readily determined by simple experiment, but concentrations in the range 1.0 to 5% have been found suitable.

Chain transfer agents may be used in the reaction in accordance with normal practice, and will in fact usually be required. In the absence of chain transfer-agents, π-allyl initiators may give polymers of such high molecular weight and low melt flow index that they are difficult to handle. Hydrogen is a very suitable chain transfer agent to use in conjunction with these initiators, and may suitably be used in concentrations from 1 to 5 molar percent based on the ethylene in the reactor.

Although the invention has been described with reference to the polymerisation of ethylene alone, we do not wish to exclude the possibility of co-polymerising other suitable monomers with the ethylene. The activity of some initiators of this invention, is, however, affected by the presence of some co-monomers.

The invention is further illustrated by but not limited to the following Examples:

For convenience the Examples are divided into four groups depending on the polymerisation technique used. These groups may be classified as follows.

Examples 1–26: Low pressure (<100 kg./cm.²) batch processes.

Examples 27 and 28: Intermediate pressure (about 200 kg./cm.²) batch process.

Examples 29–42: High pressure (1000–2000 kg./cm.²) batch process.

Example 43: High pressure (about 2000 kg./cm.²) continuous process.

The appropriate general procedure is described immediately before each group of Examples.

In order to provide a convenient indication of the degree of enhancement of activity achieved in each Example, it is expressed as a "coefficient of enhancement." This is defined as:

$$\frac{\text{Activity of Activated Initiator}}{\text{Activity of Initiator alone}}$$

Because of the different polymerisation procedures used in the various groups of Examples the activity of the initiator is calculated in different ways; the appropriate method is indicated in the general procedure section before each group of Examples. However, since the same method is used to calculate the activity of both the activated and unactivated initiators in each group, coefficients of enhancement may be calculated in each case. It is noted that the polyethylene produced in all of the Examples was of the type commonly referred to as "high density."

EXAMPLES 1–26 GENERAL PROCEDURE

A 1 litre stainless steel autoclave was purged with high purity ethylene and charged with 450 ml. toluene, and the amount of activator indicated in the specific Examples. The vessel was heated to temperature (T° C.) and ethylene and hydrogen were introduced until partial pressures of 27 kg./cm. and 10 kg./cm. respectively were attained. When the vessel was at temperature (about 160° C.) the partial pressure of the solvent was 3 kg./cm., giving a total gas pressure of 40 kg/cm. π-Allyl compound initiator (in the amount indicated), dissolved in an inert solvent, for example, Decalin or pentane, was pumped in and polymerisation was allowed to continue for the length of time indicated, after which the apparatus was cooled and vented. The polymer was then removed, washed with methanol, dried under vacuum at 80° C. and weighed. The activity was calculated on the basis of grams of polyethylene produced per millimole of initiator per hour (g./mM./hr.). In order to calculate the coefficient of enhancement, polymerisations were carried out with each initiator in the absence of activator. For tetrakis(π-allyl)zirconium without activator, conditions and results were as shown in Table 1.

TABLE 1

| | |
|---|---|
| Amount of initiator _____millimoles__ | 1.5 |
| Temperature T° C. _____° C__ | 150 |
| Time _____minutes__ | 60 |
| Yield of polyethylene _____g__ | 26.7 |
| Activity _____g./mM./hr__ | 17.5 |

EXAMPLES 1–5

These Examples illustrate the effect of varying the activator/initiator ratio. The initiator used was tetrakis(π-allyl)zirconium (1.5 millimoles in Decalin), the activator in Examples 1–3 being allyl chloride and in Examples 4 and 5 carbon tetrachloride. The polymerisation temperature was 150° C. in each Example. Results are given in Table 2.

TABLE 2

| Example number | Activator/initiator ratio [1] | Time (mins.) | Yield of polyethylene | Activity, g./mM./hr. | Coefficient of enhancement |
|---|---|---|---|---|---|
| 1 | 0.67:1 | 60 | 58.5 | 39 | 2.2 |
| 2 | 1:1 | 55 | 76.8 | 56 | 3.2 |
| 3 | 2:1 | 25 | 0 | 0 | 0 |
| 4 | 4:1 | 40 | <1 | | |
| 5 | 1:1 | 60 | 59 | 39 | 2.2 |

[1] Based on gram atoms of halogen in activator to moles of initiator.

It can be seen from these Examples that satisfactory activation is achieved at ratios below about 2:1 and preferably at about 1:1. At ratios of 2:1 and above, the aforementioned inhibiting effect may be observed.

EXAMPLES 6–12

The following Examples illustrate the advantage to be gained by purifying the π-allyl compound used as initiator. Tetrakis(π-allyl)zirconium was recrystallised from pentane before use.

It was then dissolved in Decalin before being pumped into the reactor with the exception of Example 12 in which it was dissolved in pentane. These Examples further illustrate the effect of varying activator/initiator ratio. Results are given in Table 3.

TABLE 3

| Example number | Amount of initiator (mM.) | Activator Cpd. | Activator Ratio | T., °C. | Time (mins.) | Yield (g.) | Activity, g./mM./hr. | Coefficient of enhancement |
|---|---|---|---|---|---|---|---|---|
| 6 | 0.75 | A | 0.33:1 | 160 | 100 | 75 | 60 | 3. |
| 7 | 1.0 | A | 0.5:1 | 160 | 85 | 130 | 79 | 4.5 |
| 8 | 1.5 | A | 1:1 | 150 | 10 | 73.5 | 294 | 16.8 |
| 9 | 1.5 | A | 1.3:1 | 160 | 10 | 34 | 135 | 7.7 |
| 10 | 1.5 | B | 2:1 | 150 | 25 | 0 | 0 | 0 |
| 11 | 1.5 | B | 1:1 | 150 | 10 | 90 | 180 | 10.3 |
| 12 | 1.5 | C | 1:1 | 160 | 10 | 76.1 | 304 | 17.4 |

NOTE.—A=allyl bromide. B=allyl chloride. C=t-butyl bromide.

EXAMPLES 13–21

These Examples illustrate the wide range of organic halogen compounds which may be used as activators. The ratios are all 1:1 based on gram atoms of halogen to moles of initiator. Hence for Examples 19 and 20, where the halogen compound contains two halogen atoms, 0.75 millimoles of activator were used. Results are given in Table 4. Example 20 was carried out without hydrogen, the ethylene pressure being 37 kg./cm.². The polymerisation time throughout was 60 minutes.

TABLE 4

| Example number | Activator | T., °C. | Yield (g.) | Activity, g./mM./hr. | Coefficient of enhancement |
|---|---|---|---|---|---|
| 13 | n-Propyl chloride | 150 | 48.1 | 32 | 1.8 |
| 14 | t-Butyl bromide | 150 | 61.3 | 41 | 2.3 |
| 15 | Allyl bromide | 150 | 83.6 | 57 | 3.3 |
| 16 | 2-methallyl chloride | 150 | 43.6 | 29 | 1.7 |
| 17 | Allyl fluoride | 160 | 49.3 | 33 | 1.9 |
| 18 | Allyl iodide | 160 | 79.5 | 53 | 3.0 |
| 19 | 1-chloro-2-methallyl chloride | 160 | 68.5 | 46 | 2.6 |
| 20 | 2,3-dichloropropene-1 | 160 | 47.0 | 31 | 1.8 |
| 21 | Allyl bromide [1] | 50 | 90.0 | 60 | 3.0 |

[1] Unactivated tetrakis(π-allyl)zirconium gave an activity of 20 g./mM./hr. at this temperature.

EXAMPLE 22

In order to demonstrate the use of free elemental halogen, a polymerisation was carried out using iodine as the activator. 0.75 millimoles of iodine were added to an autoclave charged with ethylene and hydrogen. 1.5 millimoles of tetrakis(π-allyl)zirconium dissolved in Decalin was pumped into the autoclave giving activator/initiator ratio of 1:1. Conditions and results are given in Table 5.

TABLE 5

| | |
|---|---|
| Temperature ° C. | 160 |
| Time, mins. | 60 |
| Yield (g.) | 74.3 |
| Activity g./mM./hr. | 49.5 |
| Coefficient of enhancement | 2.8 |

EXAMPLES 23–26

Ethylene was polymerised using other Group IV metal π-allyl compounds. The activator used throughout was allyl bromide. 1.5 millimoles of both activator and initiator was used, giving a ratio of 1:1. Since the activity of the initiator without activator differs from that of tetrakis(π-allyl)zirconium, the results of an unactivated run carried out under otherwise identical conditions precede each Example and the activity thus obtained is used to calculate the coefficient of enhancement. Results are given in Table 6.

TABLE 6

| Example number | Initiator | T., °C. | Time (mins.) | Yield (g.) | Activity, g./mM./hr. | Coefficient of enhancement |
|---|---|---|---|---|---|---|
| | TM | 50 | 60 | 22.5 | 15 | |
| 23 | TM | 50 | 60 | 66.9 | 43 | 2.9 |
| | ZC | 160 | 60 | 15.4 | 10.3 | |
| 24 | ZC | 160 | 60 | 51.1 | 34 | 3.3 |
| | ZM | 160 | 60 | 33.0 | 22 | |
| 25 | ZM | 160 | 60 | 65.0 | 43.5 | 2.0 |
| | HA | 160 | 15 | 10.1 | 26.9 | |
| 26 | HA | 160 | 15 | 30.5 | 81.4 | 2.2 |

NOTE.—TM=tetrakis(π-methallyl)titanium. ZC=tetrakis(π-crotyl)zirconium. ZM=tetrakis(π-methallyl)zirconium. HA=tetrakis(π-allyl)hafnium.

EXAMPLES 27–43 GENERAL PROCEDURE

These Examples relate to polymerisations carried out batchwise over short polymerisation times, of the same order as the residence times likely to be used under continuous reaction conditions.

To standardise reaction conditions the following general procedure was followed, in order to eliminate impurities liable to react with the initiator and which might be present in variable amount in the reaction vessel.

A stainless steel 300 ml. stirred autoclave was purged with highly purified ethylene. The autoclave was then pressurised with ethylene to P kg./cm.$^2$ and heated to T° C. Successive small portions (about 1 ml.) of a 0.5% k./v. solution of tetrakis(π-allyl)zirconium in n-heptane were injected into the autoclave, at first without effect, indicating that impurities were being destroyed. This procedure was continued until a further portion produced a rise in temperature, indicating that all impurity had been destroyed and polymerisation had commenced. A further portion of initiator was then injected and the amount of polymer produced during the period of one minute following the injection was calculated from the ethylene pressure drop.

In order to calculate a coefficient of enhancement, comparative runs were carried out in the absence of activator. All activities in these Examples are calculated on the basis of moles of ethylene polymerised per mole of initiator present in the final, i.e. effective, injection.

The results of the appropriate unactivated run are indicated in the Tables before the relevant Examples.

Examples 27 and 28 relate to processes carried out at intermediate pressures, while the remaining Examples using the above general procedure were carried out at high pressures in the range 1000–2000 kg./cm.$^2$.

EXAMPLES 27 AND 28

These two Examples demonstrate the process at intermediate pressures, that is, in the region of 200 kg./cm.$^2$. The activator used was allyl bromide at a activator/initiator ratio of 1:1. Example 28 uses the same initiator as Example 27 but after recrystallisation. Results are shown in Table 7.

TABLE 7

| Example number | P, kg./cm.$^2$ | T., °C. | Initiator injected (moles) | Activity (mole/mole) | Coefficient of enhancement |
|---|---|---|---|---|---|
| Unactivated | 220 | 158 | 1.48×10$^{-5}$ | 1,365 | |
| 27 | 222 | 161 | 0.665×10$^{-5}$ | 4,300 | 3.5 |
| Unactivated | 177 | 161 | 1.97×10$^{-5}$ | 760 | |
| 28 | 195 | 162 | 2.00×10$^{-5}$ | 4,000 | 5.3 |

EXAMPLES 29–34

These Examples illustrate the effect of varying the activator/initiator ratio in the high pressure batch process. The initiator solution was made up with 5 g. tetrakis-(π-allyl)zirconium per litre of solvent. The amount of allyl bromide added in successive runs was varied to cover ratios in the range from 0.6:1 to 6:1. The effective amount of initiator injected is calculated in these, and subsequent examples, on the basis of mole of initiators/mole of ethylene in the reactor. The results are shown in Table 8. Example 34 shows the effect of using a recrystallised initiator.

TABLE 8

| Ex. No. | P, kg./cm.$^2$ | T., °C. | Initiator injected (mole/mole of ethylene) | Activator/initiator ratio | Activity (mole/mole) | Coefficient of enhancement |
|---|---|---|---|---|---|---|
| | 1,876 | 164 | 2.1×10$^{-6}$ | (1) | 10,000 | |
| 29 | 1,850 | 164 | 0.9×10$^{-6}$ | 0.6:1 | 18,000 | 1.6 |
| 30 | 1,800 | 158 | 1.5×10$^{-6}$ | 1.3:1 | 30,000 | 3.0 |
| 31 | 1,740 | 164 | 1.6×10$^{-6}$ | 3.0:1 | 28,000 | 2.8 |
| 32 | 1,890 | 163 | 1.0×10$^{-6}$ | 4.5:1 | 8,000 | 0.8 |
| 33 | 2,020 | 160 | 2.9×10$^{-6}$ | 6.0:1 | 8,000 | 0.8 |
| 34 | 1,940 | 162 | 0.8×10$^{-6}$ | 1.2:1 | 32,000 | 3.2 |

[1] Unactivated.

EXAMPLES 35–42

These Examples illustrate the use of other organic halogen compounds as activators. The ratios in Examples 35 to 42 were all 1.2:1 based on gram atoms of halogen to moles of initiator, except for Example 41 where the halogen compound contains two halogen atoms; in this case the corresponding ratio was 2.4:1. In Example 42 the ratio was 4.8:1, and it will be noted that some inhibition of polymerisation occurred. Conditions are otherwise as set out in the general procedure above. The results are given in Table 9. The coefficient of enhancement is calculated on the basis of an activity of 10,000 mole/moles for a run under similar conditions using an unactivated tetrakis(π-allyl)zirconium initiator.

TABLE 9

| Example No. | P, kg./cm.$^2$ | T., °C. | Initiator injected (moles/mole of ethylene) | Activator | Activity (moles/moles) | Coefficient of enhancement |
|---|---|---|---|---|---|---|
| 35 | 1,890 | 163 | 0.7×10$^{-6}$ | A | 19,000 | 1.9 |
| 36 | 1,930 | 162 | 1.2×10$^{-6}$ | B | 17,000 | 1.7 |
| 37 | 1,900 | 159 | 0.9×10$^{-6}$ | C | 19,000 | 1.9 |
| 38 | 1,830 | 161 | 1.2×10$^{-6}$ | D | 23,000 | 2.3 |
| 39 | 1,840 | 162 | 1.1×10$^{-6}$ | E | 31,000 | 3.1 |
| 40 | 1,870 | 154 | 1.2×10$^{-6}$ | F | 15,000 | 1.5 |
| 41 | 2,000 | 157 | 0.9×10$^{-6}$ | G | 11,000 | 1.1 |
| 42 | 1,970 | 160 | 1.0×10$^{-6}$ | H | 5,000 | 0.5 |

NOTE.—A=1-chloropropene. B=allyl chloride. C=i-propyl chloride. D=n-propyl chloride. E=n-propyl bromide. F=i-propyl bromide. G=1.2-dibromopropane. H=carbon tetrachloride.

EXAMPLE 43

Dry ethylene containing 5 mole percent of hydrogen was compressed to 2000 atmospheres and passed into a stirred continuous polymerisation reactor. Polymerisation was conducted and maintained at a temperature of 180° C. by pumping into the reactor a catalyst made up of a 1:1 molar mixture of tetrakis (π-allyl)zirconium and allyl bromide in an inert solvent. The mean reactor dwell time was two minutes and the conversion of ethylene to polythene was 11%. 0.095 g. of zirconium tetra-allyl was needed to produce 100 g. of polymer. The density of the product was 0.956 at 23° C.

An identical run carried out using tetrakis($\pi$-allyl) zirconium in the absence of activator required 0.76 g. of initiator to produce the 100 g. of polymer. The coefficient of enhancement is therefor 8.

What we claim is:

1. A process for the polymerisation of ethylene which comprises contacting, at a temperature of from 0° to 300° C., the ethylene monomer with (1) a non-halogenated $\pi$-allylic compound of a transition metal of Group IVA of the Periodic Table as initiator, said compound containing only $\pi$-allylic groups of the general formula

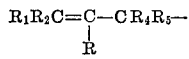

bonded to the metal wherein $R_1$ to $R_5$ are the same or different and represent hydrogen atoms or a hydrocarbyl group, and an effective amount of an activator for the initiator selected from the group consisting of free halogens and halogenated paraffins and olefins, or (2) the product obtained by mixing said initiator and said activator the ratio of activator to initiator being less than 2:1 expressed as the ratio of gram atoms of halogen present in the activator to moles of $\pi$-allylic compound initiator.

2. A process as claimed in claim 1 in which the $\pi$-allylic compound is tetrakis ($\pi$-allyl) zirconium, tetrakis ($\pi$-2-methallyl) zirconium, tetrakis ($\pi$-crotyl) zirconium, tetrakis ($\pi$-2-methallyl) titanium or tetrakis ($\pi$-allyl) hafnium.

3. A process as claimed in claim 1 in which the activator is allyl bromide, allyl chloride, n-propyl chloride, t-butylbromide, carbon tetrachloride, 2-methallylchloride, 1,2-dibromopropane, isopropyl chloride, n-propylbromide, isopropylbromide, allyl fluoride, allyl iodide, 1-chloro-1-methallylchloride, 2,3-dichloropropene, 1-chloropropene or iodine.

4. A process as claimed in claim 1 in which the polymerisation temperature is between 150 and 220° C.

5. A process as claimed in claim 1 in which the activator/initiator ratio is about 1:1.

6. A process as claimed in claim 1 in which the pressure is not less than 1600 atmospheres and temperature not less than 125° C.

7. A process as claimed in claim 1 which comprises passing ethylene through a zone of continuous reaction and passing the Group IVA $\pi$-allylic compound and the activator into the zone to cause polymerisation initiation, the combined conditions of temperature and pressure being such that the reaction mixture exists as a single fluid phase and remains as a single fluid phase until its removal from the reaction zone.

8. A process as claimed in claim 1 in which the activator and initiator are added as a solution in a single inert solvent.

9. A process as claimed in claim 1 in which the $\pi$-allylic compound initiator is recrystallised before use.

10. A process as claimed in claim 1 in which hydrogen is added to the polymerisation mixture as a chain transfer agent.

References Cited
UNITED STATES PATENTS

| | | | |
|---|---|---|---|
| 3,654,254 | 4/1972 | Job et al. | 260—94.9 C |
| 3,432,530 | 3/1969 | Wilke | 260—94.9 C |
| 3,051,690 | 8/1962 | Vandenberg | 260—88.2 |
| 3,379,706 | 4/1968 | Wilke | 260—94.9 C |
| 3,436,383 | 4/1969 | O'Brien et al. | 260—94.9 C |
| 3,454,538 | 8/1969 | Naarmann et al. | 260—94.9 C |
| 3,497,488 | 2/1970 | Dawans et al. | 260—94.9 C |
| 3,501,415 | 3/1970 | Hewig et al. | 260—94.9 B |

FOREIGN PATENTS

| | | |
|---|---|---|
| 1,211,371 | 11/1970 | Great Britain. |
| 1,425,794 | 12/1965 | France. |

OTHER REFERENCES

Sittig: Polyolefin Resin Processes, Gulf Pub. Co., Houston, Tex., 1961, pp. 35, 36 and 119.

Renfrew: Polythene, Iliffe and Lom, Ltd., London, 1957, pp. 31 and 32.

Brewster, R. Q.: Organic Chemistry, 1948, Prentice-Hall Inc., New York, pp. 64–65.

JOSEPH L. SCHOFER, Primary Examiner

E. J. SMITH, Assistant Examiner

U.S. Cl. X.R.

252—431 R